United States Patent Office 3,360,555
Patented Dec. 26, 1967

3,360,555
PROCESS FOR PRODUCING MONOSODIUM GLUTAMATE
John A. Frump, Terre Haute, Ind., assignor to Commercial Solvents Corporation
No Drawing. Filed Dec. 10, 1964, Ser. No. 417,502
12 Claims. (Cl. 260—534)

The present invention relates to the recovery of monosodium glutamate, and more particularly to the recovery of monosodium glutamate from zinc glutamate.

At present, monosodium glutamate (MSG) is produced from zinc glutamate (ZnGA) by processes involving several steps wherein glutamic acid solids are first produced and monosodium glutamate thereafter produced by reaction of the solids with sodium hydroxide. It is an object of the present invention to provide a one-stage process for the recovery of MSG from ZnGA.

The recovery process of the present invention can be represented by the equation:

$$ZnGA + Na_2HPO_4 \rightarrow MSG + ZnNaPO_4 H_2O$$

The reaction can be carried out by adding $Na_2HPO_4$ to a slurry of ZnGA and removing the resulting $$ZnNaPO_4 \cdot H_2O$$

precipitate by filtration. Monosidium glutamate can be recovered from the filtrate solution by conventional, e.g. crystallization, techniques.

It is advantageous to perform the process with a slurry of ZnGA in water to provide an aqueous solution adapted for crystallization of MSG. Quantities of water as large as desired may be used; however, it is preferable to use from about 0.8 to about 1.6 milliliters of water per gram of ZnGA to avoid the expense of evaporating water prior to crystallizatiin. The minimum amount of water necessary to obtain a workable slurry is about 0.6 milliliter of water per gram of ZnGA. Also, preferably, the water is divided between the ZnGA and the $Na_2HPO_4$ to provide a convenient way of handling both reactants. Furthermore, stirring is desirable to insure thorough mixing of the reactants.

$Na_2HPO_4$ is added to the ZnGA in an amount sufficient to convert the ZnGA to MSG. In general, amounts ranging from about 0.1 to 1.5 moles of $Na_2HPO_4$ per mole of ZnGA is sufficient to convert the ZnGA into MSG which is soluble and $ZnNaPO_4H_2O$ which is insoluble. Preferably approximately stoichiometric amounts, i.e. from about 0.8 to 1.2 moles of $Na_2HPO_4$ per mole of ZnGA, are used since, if excess $Na_2HPO_4$ is present, the MSG solution will contain phosphate impurities which are undesirable, whereas if insufficient $Na_2HPO_4$ is added, some ZnGA will be carried over with the insoluble $ZnNaPO_4 \cdot H_2O$ so that valuable product will be lost.

The temperature of the reaction is not critical. Temperatures from the freezing point to the boiling point of water under ambient pressures, generally from about 0° to about 100° C., can be used and atmospheric, as well as sub-atmospheric and super-atmospheric, pressures can be used. It is advantageous, however, to utilize temperatures of from about room temperature, e.g. 20° to 25° C., up to about 75° C. to enhance the insolubility of the $ZnNaPO_4 \cdot H_2O$ and facilitate its separating out from the MSG. Since the reaction is exothermic, such an increase in temperature will normally result so that actual heating is unnecessary although, if desired, it may be employed.

The $ZnNaPO_4 \cdot H_2O$ precipitate is filtered by conventional techniques to remove it from the MSG solution. The filter cake can be washed, e.g. with water, and the wash added to the MSG solution to recover additional MSG.

It is advantageous to react the $ZnNaPO_4 \cdot H_2O$ produced, e.g. the filter cake, with sodium hydroxide in order to recover zinc hydroxide and sodium phosphate, for example, in accordance with the equation:

$$ZnNaPO_4 \cdot H_2O + 2NaOH \rightarrow Zn(OH)_2 + Na_3PO_4$$

The precipitated zinc hydroxide can be recovered and used, for example, in the production of ZnGA by reaction with glutamic acid in a fermentation medium. In general, to recover zinc hydroxide the $ZnNaPO_4 \cdot H_2O$ is slurried with water and sufficient sodium hydroxide added to precipitate the insoluble zinc hydroxide which can be recovered by filtration. Preferably, about two moles of sodium hydroxide are added for each mole of $$ZnNaPO_4 \cdot H_2O$$

In general, this reaction may be carried out at temperatures of from about 0° to about 100° C. and at atmospheric pressures, super-atmospheric or sub-atmospheric pressures. The soluble $Na_3PO_4$ can also be recovered from the filtrate by spray drying or evaporating to dryness. Additionally, the $Na_3PO_4$ solution can be used to provide MSG from ZnGA by adding $H_3PO_4$ to the solution in an amount sufficient to convert it to equivalent $Na_2HPO_4$ for use in the formation of MSG as discussed above. $Na_3PO_4$ is a valuable by-product of the process and is used in detergent materials.

The following examples serve to further illustrate the invention without, however, limiting the same.

*Example I*

One mole of ZnGA (246.4 gms.) was slurried with 140 mls. of water and heated to 60° C. One mole of $Na_2HPO_4$ (142 gms.) was dissolved in 60 mls. of water, heated to 60° C. and added to the ZnGA slurry. Agitation was continued for 30 minutes while maintaining the temperature at 60° C. The mixture was cooled to 25° C. and filtered. The filter cake was washed five times with 25-ml. portions of water. Combining the filtrate and washes gave a total volume of 435 mls. containing 335 gms./liter glutamic acid, with a pH of 7.0. This represents 99% recovery of glutamic acid from ZnGA to MSG solution.

The MSG solution was decolorized with activated carbon and an ion exchange resin. Two volumes of ethanol were added and MSG crystals were recovered by filtration. The crystals were 99.42% pure. Recovery from ZnGA to MSG crystals was 86%, with the balance remaining in the water-ethanol filtrate where recovery could be made by recycling. The MSG crystals contained 29 p.p.m. Zn. The product contained 112 p.p.m. $PO_4$.

The filter cake from the original filtration weighed 199.5 gms. (dry). It contained 31.1% Zn and 47.4% $PO_4$. Theory for $ZnNaPO_4 \cdot H_2O$ is 32.4% Zn and 47.2% $PO_4$. This represent 95% recovery of Zn from ZnGA to $ZnNaPO_4 \cdot H_2O$.

*Example II*

One mole of $ZnNaPO_4 \cdot H_2O$ (201 gms.) was slurried with 300 mls. of water and heated to 100° C. Two moles of NaOH (160 gms. of 50% solution) were added and the temperature was maintained at 100° C. while agitating for 30 minutes. The reaction mixture was filtered at 100° C. and the filter cake was washed with hot water. The dry cake weighed 80 gms. and contained 74.8% Zn and 1.53% $PO_4$, representing about 96% conversion to $Zn(OH)_2$, which also contained about 1.3% of the original $PO_4$ present in $ZnNaPO_4 \cdot H_2O$.

The $Zn(OH)_2$ (80 gms.) was slurried with 300 mls. of water, 104 gms. of 96% $H_2SO_4$ were added, and after the reaction was complete, the mixture was filtered. The filtrate weighed 777 gms. and contained 7.67% Zn, or 99.5% of the Zn originally present in the $Zn(OH)_2$. The $ZnSO_4$ solution is satisfactory for further use in the recovery of glutamic acid as ZnGA from a fermentation medium.

The $Na_3PO_4$ filtrate (872 mls.) contained 10.75% $PO_4$ (98.7% of the original $PO_4$) and is satisfactory for further use in the recovery of MSG from ZnGA.

It is claimed:

1. A process for the recovery of monosodium glutamate from zinc glutamate which comprises adding $Na_2HPO_4$ to an aqueous zinc glutamate slurry in an amount sufficient to precipitate $ZnNaPO_4 \cdot H_2O$, separating the precipitated $ZnNaPO_4 \cdot H_2O$ and recovering monosodium glutamate from the solution remaining.

2. Process of claim 1 wherein said amount is from about 0.1 to about 1.5 moles of $Na_2HPO_4$ per mole of zinc glutamate.

3. Process of claim 1 wherein said amount is from about 0.8 to about 1.2 moles $Na_2HPO_4$ per mole zinc glutamate.

4. Process of claim 1 wherein said slurry contains from about 0.8 to about 1.6 milliliters of water per gram zinc glutamate.

5. Process of claim 1 wherein the temperature is between about 0° and 100° C.

6. Process of claim 1 wherein the temperature is between about room temperature and 75° C.

7. Process of claim 1 further including the steps of slurrying said $ZnNaPO_4 \cdot H_2O$ in water, adding sufficient NaOH to the slurry so produced to precipitate $Zn(OH)_2$, separating the $Zn(OH)_2$ and recovering $Na_3PO_4$ from the solution remaining.

8. Process of claim 7 wherein approximately two moles NaOH are added per mole of $ZnNaPO_4 \cdot H_2O$.

9. Process of claim 7 wherein the NaOH is reacted with $ZnNaPO_4 \cdot H_2O$ at a temperature of from about 0° to about 100° C.

10. Process of claim 7 wherein said $Na_3PO_4$ is converted to $Na_2HPO_4$ by the addition thereto of $H_3PO_4$ and the $Na_2HPO_4$ so produced used to produce additional monosodium glutamate.

11. A process for the production of $Na_3PO_4$ which comprises the steps of slurrying said $ZnNaPO_4 \cdot H_2O$ in water, adding sufficient NaOH to the slurry so produced to precipitate $Zn(OH)_2$, separating the $Zn(OH)_2$ and recovering $Na_3PO_4$ from the solution remaining.

12. Process of claim 11 wherein the NaOH is reacted with $ZnNaPO_4 \cdot H_2O$ at a temperature of from about 0° to about 100° C.

References Cited
UNITED STATES PATENTS 3,278,572  10/1966  Frump _____ 260—534 XR LORRAINE A. WEINBERGER, *Primary Examiner.*

A. P. HALLUIN, *Assistant Examiner.*